FAIRBANKS & PADDOCK.
Weighing Scale.

No. 111,733.

2 Sheets—Sheet 1.

Patented Feb. 14, 1871.

Witnesses:
C. C. Livings
H. E. Price.

Inventors:
T. Fairbanks and H. Paddock
by their atty J. D. Stetson

2 Sheets—Sheet 2.

FAIRBANKS & PADDOCK.
Weighing Scale.

No. 111,733.

Patented Feb. 14, 1871.

UNITED STATES PATENT OFFICE.

FRANKLIN FAIRBANKS AND HARVLIN PADDOCK, OF ST. JOHNSBURY, VT.

IMPROVEMENT IN WEIGHING-SCALES.

Specification forming part of Letters Patent No. 111,733, dated February 14, 1871.

*To all whom it may concern:*

Be it known that we, FRANKLIN FAIRBANKS and HARVLIN PADDOCK, of St. Johnsbury, in the county of Caledonia and State of Vermont, have invented certain new and useful Improvements in Weighing-Scales; and we do hereby declare that the following is a full and exact description thereof.

Our invention may be used for the weighing of any articles of considerable weight, and in connection with any form and arrangement of platform or other suitable means for receiving the load to be weighed; but it is more especially adapted for use in connection with railroad-track scales, and with scales for the weighing of loads of coal, ore, ice, or other material in which it is more important to weigh very rapidly, with a close approximation to accuracy, than to weigh with absolute accuracy at an expenditure of more time.

We term our invention a "quick-weigher." It weighs very rapidly and with very close approach to mathematical correctness.

We have also provided means for automatically registering or taking account of the weights, so that the sum of a great number of loads shall be indicated.

We use the ordinary weighing-beam, with a poise adapted to be adjusted thereon. We can use any ordinary or suitable form of beam and poise.

We may use a pinching-screw or other proper means for securing the poise with great firmness in any position desired.

In weighing a series of loads which are approximately equal, we adjust the poise so that it shall be in a position to indicate a weight within the smallest load liable to be presented, and then employ our peculiar means, in combination with the beam, &c., to indicate the remainder or the surplus of the weight over and above that which corresponds to the position of the poise.

We will proceed to describe what we consider the best means of carrying out our invention, and will afterward designate the points which we believe to be new therein.

The accompanying drawing forms a part of this specification.

Figure 1:
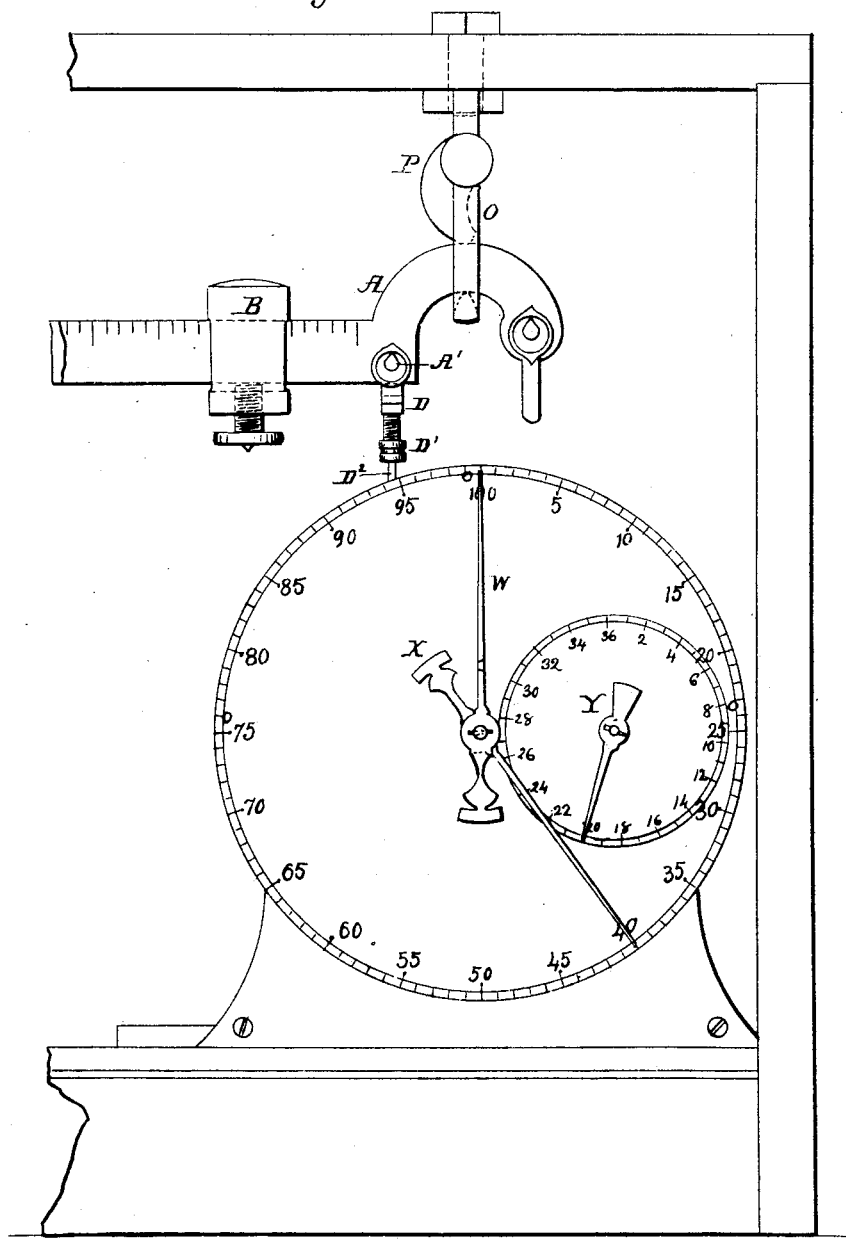
Figure 2:
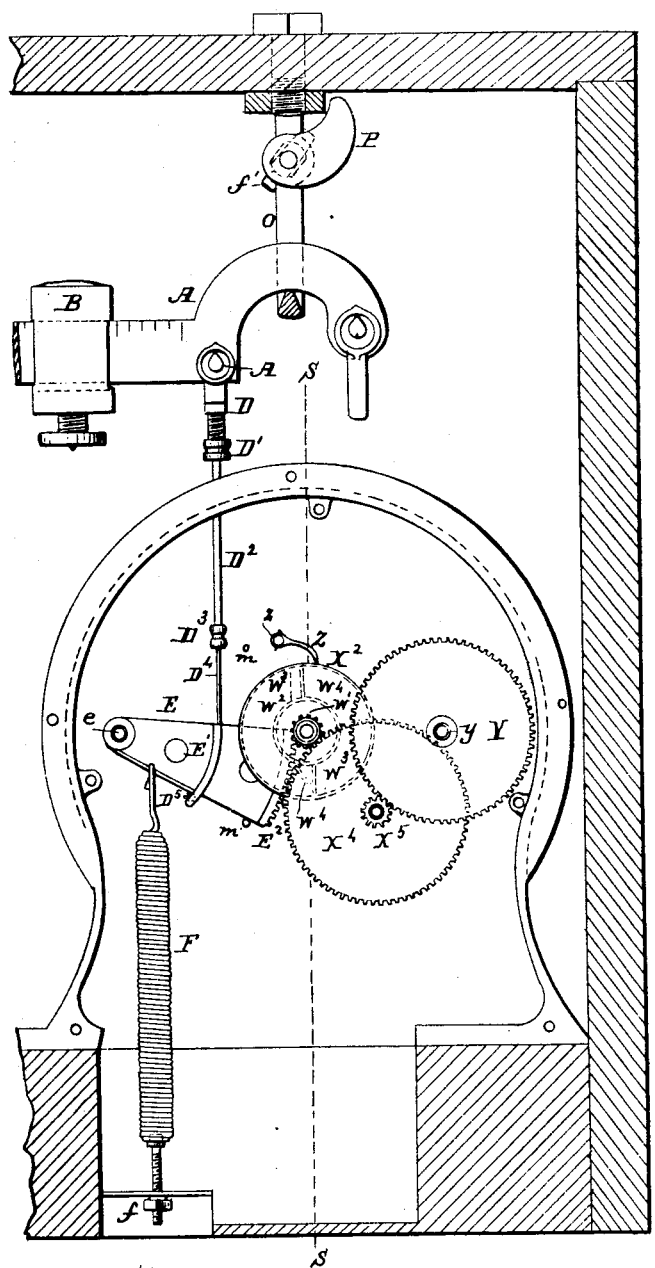
Figure 3:
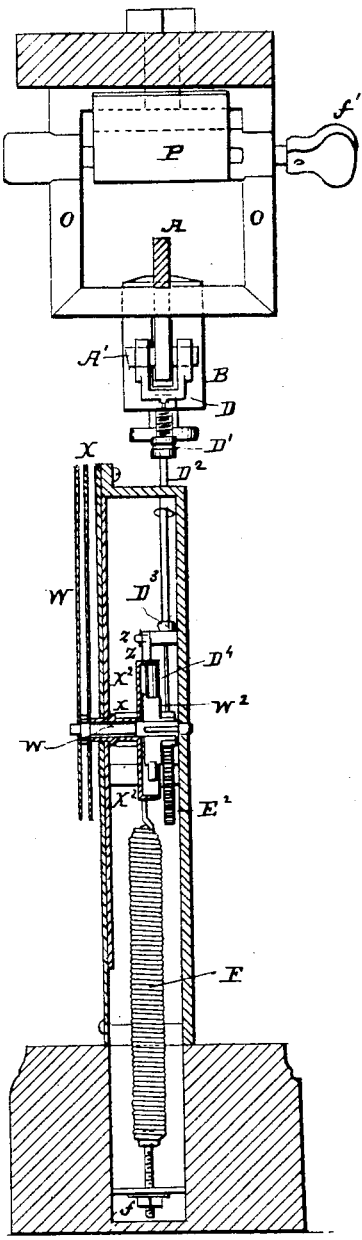

Figure 1 is a front elevation, showing the dial with its several indexes, and the vibrating end of the part which corresponds to the weighing-beam of an ordinary weighing-scale. This figure shows also the peculiar trig-loop which we employ with a portion of the fixed frame-work. Fig. 2 is a vertical section through the same parts, showing the mechanism exposed in face view. Fig. 3 is a vertical section at right angles to the last on the line S S in Fig. 2.

Similar letters of reference indicate corresponding parts in all the figures.

The drawing represents the novel parts with so much of the ordinary parts as seems necessary to indicate their relation thereto.

A is a portion of the graduated beam, which corresponds, in its connection with the other portions not represented, with an ordinary graduated beam of a scale for weighing hay or the like. B is a poise, adjustable thereon, and provided with an ordinary pinching-screw, for holding it firmly in any position in which it is adjusted.

There is the ordinary knife-edge at the outer or right-hand extremity of the beam, which may have the ordinary link and rod for receiving a fixed or a variable counterpoise. (Not represented.

The inner knife-edge, $A^1$, receives a link, D, and connects the beam A with a mechanism which performs the important function of instantly indicating to the eye the amount by which the weight of the charge exceeds the weight corresponding to the position of the poise B. This mechanism also adds up the weight, as will be explained below.

The mechanism for accomplishing these ends is operated by a rod, $D^2$, which is connected to the link D by a screw-coupling, $D^1$, which allows the rod $D^2$ to be adjusted up and down relatively to the beam A.

There is a downward tension on the rod $D^2$, which increases as it is drawn upward by the motion of the beam.

The amount of the weight in excess of that indicated by the poise B is determined by the amount of rise of the beam A against the increasing tension on the rod $D^2$.

There are many modes by which the weight may be placed on and removed from the platform. (Not represented.)

We believe that our invention may be used with success in weighing a train of loaded freight-cars, by making the platform a part of the track of a length sufficiently in excess of the wheel-base of a car to carry the entire car alone for a little period, say two or three seconds. During this period the attendant must observe the position of the index on the dial we describe below. The weighing of one car will be followed by a period during which the conditions are irregular.

One or more pairs of wheels of the car just weighed will remain on the platform, and one or more pairs of wheels from the succeeding car will be on the platform.

During this period the beam A will be liable to move up and down irregularly; but so soon as the next succeeding car is fairly upon the platform, and the platform is clear of other load, the apparatus will commence to indicate the weight of that, the succeeding car. In such case, and in other and more ordinary cases, it is desirable to hold the beam A firmly during the periods between the successive weighings.

There has been long in use a device known as a "trig-loop," in which, by pressing endwise and partially turning a bar or stop extending over the beam A, the beam may be held firmly down, or liberated and allowed to tilt, as may be desired. We employ an analogous device; but we have modified its form so that on turning it in the ordinary manner, instead of liberating the beam suddenly, and allowing it to jump with violence into the position corresponding to the excess of weight, in which case it would be liable to move beyond the proper point by its momentum, we liberate it always very gradually.

O is the fixed portion or frame of our trig-loop, and P is the turning part therein. The part O may be of the ordinary construction. The part P is of the ordinary construction and arrangement, except that its outline presents a volute curve, like the mainspring of a watch, but expanding more rapidly.

On liberating the piece P, by moving it endwise against the force of a spring and turning it in the ordinary manner, the turning may be effected as rapidly as usual, while the volute curved form of the exterior of the piece P, instead of liberating the beam suddenly, insures its gradual liberation, so that the beam A is compelled to rise into its proper position slowly. Its speed will be moderated or restrained by this means, so that it will avoid the difficulty referred to, due to accumulated momentum.

Having now described how our beam is liberated slowly, it will be readily seen that the reverse motion of the piece P moves it gradually back to its lowest position, and that this alternate liberating and confining of the beam A, although gradual, as described, may still be effected in a very brief interval of time.

In weighing cars, as above described, the car should come upon the platform while the beam is confined. Then the piece P should be instantly turned to allow the beam to rise slowly.

So soon as the beam has attained the elevation due to the surplus of weight of the charge over that indicated by the poise B it will stop, and the further turning of the piece P will carry it out of contact therewith. That condition obtains for one or more seconds, after which, as the car commences to leave the platform, the piece P is again turned back to confine the beam A again firmly in its lowest position.

During the period while this car is partially off the platform and the next one partially on, the beam is held firmly down. The attendant watches the succeeding car, and, the moment its last pair of wheels is upon the platform, again rapidly turns the piece P, and slowly liberates the beam, waits a little, and again turns the piece P back to confine the beam.

In ordinary cases the weighing may be more deliberate.

A loaded car or wheelbarrow is placed upon the platform and stopped there in the ordinary manner, with the piece P holding the beam A down. Then the piece P is turned, and the beam is allowed to rise slowly and stand for any length of time. Then the piece P is again turned back and the load removed.

W and X are indexes, which, working on a face or dial graduated to indicate pounds, as represented, indicate to the eye the amount of the charge now weighed, and also the sum of the whole amounts weighed. Y is a shorter index, turning on a separate center, and turning more slowly to register the hundreds or such other multiple as may be found expedient in thus registering a large number of loads. The index W is fixed upon a shaft, $w$, which turns forward to indicate the weight, and at the termination of each weighing operation moves back to zero. The index X, on the contrary, is fixed on a tube, $x$, concentric to the shaft $w$, and does not move back, but moves forward at each weighing operation to an extent corresponding to the weight, and remains fixed in its extreme forward position until again moved forward in the next weighing operation. The index X, therefore, and the connected index Y are registering-indexes. By their aid the total quantity weighed may be read off at any time in a manner closely analogous to that by which the total quantity of gas passing through a gas-meter is registered by the aid of a succession of dials on the exterior thereof.

We have already stated generally that the upward motion of the beam A in the weighing operation is opposed by a resisting force which increases as the beam rises, and that the success of the weighing operation is attained by the beam rising through only part of the space through which it is allowed to rise by the movement of the cam P. The rise being greater in proportion as the weight of the charge is greater, it will be readily understood in a general way that the rotation of the shaft $w$, and consequently the movement of the index W and of the registering-indexes X and Y, is greater or less, according as the beam A rises to a greater or lesser extent. This end may be attained by very simple connections through springs and gears with pawls; but we have found a number of nice details and adjustments important to the success of the operation.

The rod $D^2$, having a vertical motion corresponding to that of the beam A, is coupled at the point $D^3$ to a strong and flexible cord of gut or analogous material, $D^6$. This is secured at the point $D^5$, and partially winds and unwinds on a curved surface, $E^1$, upon a sector, E, which turns upon a pivot or axis, $e$. This sector E is drawn downward by a coiled spring, F, which is secured by an adjustable nut, $f$, to a fixed point below, so as to allow its tension to be increased and diminished by turning the said nut.

The periphery or arc of the sector E is provided with fine and accurately cut teeth $E^2$, which mesh into corresponding teeth in a pinion, $W^1$, fixed on the shaft $w$ of the index W. Now, stops being provided to limit the extreme motion of the sector, as represented by $m$, it will be readily understood how the vertical rise of the beam A stretches the spring F until its increasing tension balances the tendency of the beam A to rise farther, and the index W turns around on the dial and indicates conveniently to the eye, by its magnified motion, the extent to which it has risen, and, consequently, the amount of the weight, or rather the surplus of the weight over and above that indicated by the position of the poise B; and how, after each weighing operation has been completed, the descent of the beam A and the corresponding motion of all the other parts return the index W back to its vertical position, where it indicates zero.

The registering is effected by delicate mechanism, which offers no appreciable resistance to the motion.

On the shaft $w$ is a wheel, $W^2$, working within a hollow cylinder, $X^2$, fixed upon the tube or sleeve $x$, before described. The interior surface of the cylinder $X^2$ is finished very accurately concentric to the wheel $W^2$. The considerable space between the exterior of the wheel $W^2$ and the interior of the cylinder $X^2$ carries peculiar friction-pawls $W^3$, mounted opposite to each other, and standing in a line nearly radial to the shaft $w$. The inner end of each rests in a notch on the exterior of the wheel $W^2$, as represented, while the outer end is adapted to run smoothly and easily within the smooth interior of the cylinder $X^2$. There are delicate springs, $W^6$, carried upon the wheel $W^2$, which press the friction-pawls $W^3$ constantly into a position more nearly radial. Now, when the shaft $w$ is turned backward at the close of the weighing operation, the friction-pawls $W^3$ are deflected a little more than usual away from their radial positions by their slight friction against the interior of the fixed cylinder $X^2$. When the next charge is received upon the scale and the beam A rises, and the index W, and consequently the wheel $W^2$, turn forward through any given arc, the friction of the outer ends of the pawls $W^3$ against the interior of the cylinder $X^2$ causes the pawls to assume a position more nearly radial, and thus induces such an increase of the friction that the cylinder $X^2$, and consequently the sleeve $x$ and index X and their connections, are turned forward. It follows that at each weighing operation the index X moves forward to the same extent as the index W. The exterior of the cylinder $X^2$ is cut with fine teeth, like a file, adapted to receive a delicate pawl, Z, hung on the fixed center $z$. This allows the cylinder $X^2$ and its connections to move forward without appreciable resistance, but prevents its turning backward.

The gearing by which the intermittent forward motion thus imparted to the shaft $x$ is made to correspondingly move the slower shaft of the index Y is very plainly indicated in the drawing.

The small wheel $W^1$ on the sleeve X gears into the large wheel $X^4$ on an independent shaft, which carries a small pinion, $X^5$, which in turn gears into a large wheel, $Y^1$, on the shaft $y$. The proportions of these wheels may be varied at pleasure.

We have represented the shaft $y$, and consequently the index Y, as making one revolution to each one hundred revolutions of the sleeve $x$ and index X.

It is very important to be able to adjust the resistance to the rise of the beam A very delicately, and also to be able to adjust it within wide limits. We can adjust the resistance delicately by turning the nut $f'$, and we can adjust the connection of the beam A to the several indexes by means of the screw-coupling $D^1$. By means of the latter ($D^1$) we can adjust the zero-point of the index W, and consequently the starting-point of all the mechanism; and by means of the former (the nut $f'$) we can vary the scale or the magnitude of the units registered very delicately. But it is desirable, in addition to these adjustments, to provide means for allowing for very great variations in the size or temper or other conditions of the springs employed. When, for any reason, we wish to make great changes in the conditions of the spring, we change the point of attachment by hooking the top of the spring F into different holes in a flange, $E^3$, upon the sector E. We esteem this adjustment, not only of the length of the spring F by the nut $f'$ or its equivalent, but also of its leverage on the sector by changing the point of its attachment thereto, a very important feature of our apparatus.

The change may be effected more delicately than by changing into different holes, as here represented, either by providing two or more series of holes, so that a hole in one series shall occupy a position intermediate between two of the holes in another series, or by providing a sliding clamp, operated by a screw or otherwise, so as to change the position with any required degree of delicacy. We prefer for various reasons the construction here represented.

All the ordinary care and provisions against errors and for compensating for errors, such as arise from change of dimensions due to heat and cold, the spring bending, or general elastic action due to great strains on the apparently rigid beam and other parts, should be attended to with our invention as with others. There is only one point where any peculiar source of error due to our machinery seems to require suggestion here. This we will briefly explain.

Our peculiar friction-pawls $W^3$, while allowing the movement to be transmitted with extraordinary delicacy, are liable to involve a slight loss of motion—that is to say, the shaft $w$, after turning forward to a certain extent to indicate the weight, on turning back to zero should change the position of the friction-pawls $W^3$ within the hollow cylinder $X^2$ to an extent exactly equal to the arc of motion of the index W. But the elasticity of the parts is liable to involve a loss of motion, so that the moved wheel $X^2$ is not in practice turned to the same extent as the mover-wheel $W^2$; but the error will be uniform, and it can be compensated for very exactly by adjusting the apparatus by turning the coupling-screw $D^2$ so that the starting-point of the index W is not zero, but is one graduation, or more or less, to the left of the zero-point; in other words, the index W must start from a minus-point, and must move from that point to zero over an angular space exactly equal to the angular motion lost by our friction-pawls arrangement.

This compensates for the error in the registering; but now both the registering and the indicating hands or indexes W and X will show one pound, or whatever the quantity may be, less than the true surplus of the weight over that indicated by the poise. If we now take off from the poise, by drilling or otherwise, a small quantity, just sufficient to compensate for this error, the scale is then in condition to both indicate and register correctly, notwithstanding the loss of motion due to our peculiar ratchet mechanism.

We claim—

1. The adjustable leverage of the force F on the segment E, or its equivalent, in combination with a weighing-scale, as and for the purposes specified.

2. The within-described friction-pawls $W^3$, wheel $W^2$, and hollow cylinder $X^2$, or its equivalent, in combination with a weighing-scale and with registering mechanism, as specified.

In testimony whereof we have hereunto set our names in presence of two subscribing witnesses.

FRANKLIN FAIRBANKS.
HARVLIN PADDOCK.

Witnesses to Franklin Fairbanks's signature:
WM. C. DEY,
C. C. LIVINGS.

Witnesses to Harvlin Paddock's signature:
J. M. ALVORD,
THOMAS SPOONER.